US012746878B2

(12) United States Patent
Choi et al.

(10) Patent No.: US 12,746,878 B2

(45) Date of Patent: Sep. 29, 2026

(54) DIGITAL REAR MIRROR CONTROL APPARATUS OF A VEHICLE AND CONTROL METHOD THEREOF

(71) Applicant: THINKWARE CORPORATION, Seongnam-si (KR)

(72) Inventors: Sung Rak Choi, Seongnam-si (KR); Tae Jin Kim, Seongnam-si (KR); Ho Kwan Lee, Seongnam-si (KR); Hyun Chul Cho, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/947,410

(22) Filed: Nov. 14, 2024

(65) Prior Publication Data

US 2026/0054648 A1 Feb. 26, 2026

(30) Foreign Application Priority Data

Nov. 14, 2023 (KR) ........................ 10-2023-0157755
Nov. 27, 2023 (KR) ........................ 10-2023-0166910
Nov. 27, 2023 (KR) ........................ 10-2023-0166936
Nov. 14, 2024 (KR) ........................ 10-2024-0161898

(51) Int. Cl.

| | |
|---|---|
| *B60R 1/26* | (2022.01) |
| *G06T 5/40* | (2006.01) |
| *G06T 7/11* | (2017.01) |
| *G09G 3/32* | (2016.01) |
| *H04N 23/71* | (2023.01) |
| *H04N 23/76* | (2023.01) |

(52) U.S. Cl.

CPC .................. *B60R 1/26* (2022.01); *G06T 5/40* (2013.01); *G06T 7/11* (2017.01); *H04N 23/71* (2023.01); *H04N 23/76* (2023.01); *B60R 2300/307* (2013.01); *G06T 2207/30252* (2013.01); *G09G 3/32* (2013.01); *G09G 2320/0626* (2013.01); *G09G 2380/10* (2013.01)

(58) Field of Classification Search

CPC .... B60R 1/26; G06T 7/11; G06T 5/40; H04N 23/76; H04N 23/71

See application file for complete search history.

(56) References Cited

U.S. PATENT DOCUMENTS

| | | | | |
|---|---|---|---|---|
| 5,963,665 | A * | 10/1999 | Kim | G06T 5/40 348/673 |
| 8,339,526 | B2 * | 12/2012 | Minikey, Jr. | G02B 27/01 349/67 |
| 10,933,812 | B1 * | 3/2021 | Nagasawa | B60K 35/60 |
| 2017/0217368 | A1 * | 8/2017 | Lewis | H04N 7/183 |

* cited by examiner

*Primary Examiner* — Jae N Noh

(74) *Attorney, Agent, or Firm* — SALIWANCHIK, LLOYD & EISENSCHENK

(57) ABSTRACT

Provided is a digital rear mirror control method of a vehicle for improving a driver's visibility by considering the internal or external environment of the vehicle.

13 Claims, 10 Drawing Sheets

DIGITAL REAR MIRROR CONTROL APPARATUS OF A VEHICLE AND CONTROL METHOD THEREOF

CROSS-REFERENCE TO RELATED APPLICATIONS

This application claims the benefit of Korean Application Nos. 10-2024-0161898, filed Nov. 14, 2024; 10-2023-0166936, filed Nov. 27, 2023; 10-2023-0166910, filed Nov. 27, 2023; and 10-2023-0157755, filed Nov. 14, 2023, the disclosure of each of which is incorporated by reference herein in its entirety.

TECHNICAL FIELD

The present disclosure relates to a digital rear mirror control apparatus of a vehicle that is capable of inhibiting driver glare through image processing, and a control method thereof.

TECHNOLOGY BACKGROUND OF THE INVENTION

In general, a vehicle may be mounted with left and right side mirrors and a rear mirror (rearview mirror) to check a rearward state of the vehicle to provide driving convenience and stability, and each of these mirrors may be adjusted to various angles based on the body type, driving habit, or the like of a driver, thus providing the driver with a secured rearward view.

A conventional analog rear mirror may be operated by reflecting a situation behind the vehicle, and this method has several limitations. For example, the driver may experience glare if a following vehicle emits strong headlights when driving at night, or have a rear view obstructed by large cargo or a rear-seat passenger.

In addition, the rear view that the driver may secure may be limited depending on the size and installation location of the rear mirror, thus creating a new technical need for improving this issue.

To solve this issue, the digital rear mirror has been developed. The digital rear mirror may use a manner in which a camera mounted on the rear of the vehicle captures an image in real time and outputs the same to a display installed inside the vehicle to thus directly display a rear image instead of an existing reflective mirror. The digital rear mirror may thus provide a wide viewing angle and minimize a visual obstruction caused by light reflection or an external object.

However, with the introduction of the digital rear mirror, technology has become important for controlling the camera image to be accurately reflected in real time. For example, there is a need for a technical solution for enabling the driver to always secure the optimal rear view by controlling various factors such as the quality, brightness adjustment, distortion correction, and screen switching speed of the camera image. This technology may need to be designed to ensure reliable performance under a variety of driving conditions, including a weather condition, a lighting change, and a speed of the vehicle.

That is, a digital rear mirror control method may be a technology developed to maximize the safety and convenience of the driver, and include various technical solutions for manipulating and controlling the display to secure the rear view.

CONTENTS OF THE INVENTION

Problems to be Solved

An object of the present disclosure is to solve a problem in which a digital rear mirror of a vehicle obstructs a driver's view, such as glare, by being adapted in real time to a change in an external environment.

In addition, an object of the present disclosure is to improve visual visibility for the driver to clearly check a rear situation in various environments.

In addition, an object of the present disclosure is to improve visual visibility by detecting a change in the interior and exterior illuminance of a vehicle in real time and collecting data using a camera and an illuminance sensor, mounted on a vehicle.

In addition, an object of the present disclosure is to maintain readability of a screen viewed by a driver in the optimal state by analyzing collected image data and automatically adjusting image brightness when the brightness is insufficient or excessive.

In addition, an object of the present disclosure is to assist in securing a driver's view by automatically performing brightness correction of a digital rear mirror based on various lighting conditions occurring while driving a vehicle.

In addition, an object of the present disclosure is to provide the optimal rear view by automatically adjusting brightness of a digital rear mirror when a large difference occurs between the exterior and interior illuminance (e.g., strong headlights from a following vehicle when driving at night).

Means for Solving the Problem

According to an embodiment of the present disclosure, provided is a digital rear mirror control method of a vehicle, the method including: an input step of receiving a vehicle exterior image from a camera disposed on the vehicle; an image analysis step of segmenting the input image into a plurality of regions based on a predetermined criterion for the input image; a determination step of determining whether the input image requires correction by comparing a brightness value of the region segmented in the image analysis step with a predetermined threshold range; and an image processing step of adjusting brightness of the input image if the brightness value of at least one of the segmented regions is out of the threshold range.

In the image analysis step, at least one of the pixel value or pixel distribution (histogram) of the input image may be used as the criterion to segment a dark region and a bright region within the input image.

The method may further include an illuminance measurement step of measuring, by an illuminance sensor, the interior or exterior illuminance of the vehicle after the image analysis step, wherein in the determination step, whether the input image requires the correction is determined using the measured illuminance and brightness of the segmented region as the criterion.

In the illuminance measurement step, a difference may be measured between a light amount measured by a front illuminance sensor disposed at the front of the vehicle and a light amount measured by a rear illuminance sensor disposed at the rear of the vehicle.

The determination step may be performed if the light amount measured by the rear illuminance sensor is greater than the light amount measured by the front illuminance sensor in the illuminance measurement step.

A digital rear mirror may include a mirror film that outputs the vehicle exterior image or optically reflects a rear situation of the vehicle based on an electrical signal.

The method may further include a step of reducing reflectivity of the mirror film that is performed if the light amount measured by the rear illuminance sensor is less than the light amount measured by the front illuminance sensor in the illuminance measurement step.

A digital rear mirror may include a pixel array layer including micro light-emitting diode (LED) elements.

In the image processing step, the brightness of the segmented region may be adjusted if the brightness value of the at least one of the segmented regions is out of the threshold range.

The method may further include: an image output step of outputting an image whose brightness is adjusted in the image processing step; an illuminance measurement step of measuring, by an illuminance sensor, the interior and exterior illuminance of the vehicle after the image output step; and a brightness adjustment step of adjusting display brightness of a digital rear mirror by using the measured illuminance as the criterion.

In the illuminance measurement step, a difference may be measured between a light amount measured by a front illuminance sensor disposed at the front of the vehicle and a light amount measured by a rear illuminance sensor disposed at the rear of the vehicle.

In the brightness adjustment step, the display brightness may be reduced if the light amount measured by the rear illuminance sensor is greater than the light amount measured by the front illuminance sensor.

In the brightness adjustment step, the display brightness may be adjusted by comparing the light amount measured by the front illuminance sensor with a predetermined value if the light amount measured by the rear illuminance sensor is less than the light amount measured by the front illuminance sensor in the illuminance measurement step.

According to an embodiment of the present disclosure, provided is a program stored on a computer-readable recording medium including a program code for executing the digital rear mirror control method of a vehicle as described above.

According to an embodiment of the present disclosure, provided is a computer-readable recording medium including a program code for executing the digital rear mirror control method of a vehicle as described above.

According to an embodiment of the present disclosure, provided is a digital rear mirror including a mirror film that outputs a vehicle exterior image or optically reflects a rear situation of the vehicle based on an electrical signal that is selectively input thereto; a camera capturing an external environment of the vehicle; and an image processing device receiving a captured image and adjusting image brightness, wherein the image processing device segments the image input from the camera into a plurality of regions based on a predetermined criterion, and determines whether the input image requires brightness correction by comparing a brightness value of the segmented region with a predetermined threshold range.

Wherein the image processing device may segment a dark region and a bright region within the input image by using at least one of the pixel value or pixel distribution (histogram) of the input image as the criterion.

The apparatus may further include a sensor unit including a sensor that measures the interior and exterior illuminance of the vehicle, wherein the image processing device determines whether the input image requires the correction based on brightness of the segmented region and the interior and exterior illuminance of the vehicle measured by the sensor unit as the criterion.

According to an embodiment of the present disclosure, provided is a digital rear mirror control apparatus of a vehicle, the apparatus including: a digital rear mirror including a pixel array layer that includes micro light-emitting diode (LED) elements; a camera capturing an external environment of the vehicle; a sensor unit including a sensor that measures the interior and exterior illuminance of the vehicle; and an image processing device receiving a captured image and adjusting image brightness, wherein the image processing device segments the image input from the camera into a plurality of regions based on a predetermined criterion, and determines whether the input image requires brightness correction by comparing a brightness value of the segmented region with a predetermined threshold range.

The image processing device may adjust brightness of the segmented region if the brightness value of at least one of the segmented regions is out of the threshold range.

Each feature of the embodiments described above may be implemented in combination with another embodiment, as long as the corresponding feature does not contradict or exclude another embodiment.

Effects of the Invention

As set forth above, according to the various embodiments of the present disclosure, the driver may always secure the optimal rear view by automatically adjusting the brightness of the screen on the digital rear mirror based on the change in the external environment.

In addition, the screen may be inhibited from being excessively bright or dark by analyzing the difference between the interior and exterior brightness of the vehicle in real time by using the camera and the illuminance sensor.

In addition, the driver may clearly perceive the rear situation regardless of the surrounding environment by automatically performing the brightness correction even under the various lighting conditions.

In addition, the driver may experience the reduced glare caused by the headlights of the following vehicle when driving at night, and the minimized visual discomfort.

In addition, the mirror film or the micro LED elements may be used to finely adjust the brightness as needed, thus providing the optimal visibility in the specific situation.

Advantageous effects of the disclosure are not limited to those mentioned above, and other effects not mentioned here may be obviously understood by those skilled in the art from the description provided above.

DETAILED DESCRIPTION

Hereinafter, specific embodiments of the disclosure are described with reference to the accompanying drawings. A detailed description below is provided to facilitate comprehensive understanding of a method, an apparatus, and/or a system, described in the specification. However, this description is only an example, and the present disclosure is not limited thereto.

In describing the embodiments of the present disclosure, omitted is a detailed description of a case where it is decided that the detailed description of the known functions or configurations related to the present disclosure may unnecessarily obscure the gist of the present disclosure. In addition, terms described below are defined in consideration of their functions in the present disclosure, and may be construed in different ways according to intentions of users or operators, practices, or the like. Therefore, the terms should be defined on the basis of the contents throughout the specification.

Terms used in the detailed description are provided merely to describe the embodiments of the disclosure, and should not be construed to be restrictive. A term of a single number may include its plural number unless explicitly indicated otherwise.

It should be understood that terms "include", "have", or the like, used in the specification specify certain features, numerals, steps, operations, elements, portions, or combinations thereof, and it should not be construed to exclude the presence or possibility of one or more other features, numbers, steps, operations, elements, portions, or combinations thereof other than those described.

In addition, terms such as "first", "second", A, B, (a), and (b) may be used in describing components in an embodiment of the present disclosure. These terms are used only to distinguish any components from other components, and features, orders, sequences, or the like of the corresponding components are not limited to these terms.

Figure 1:
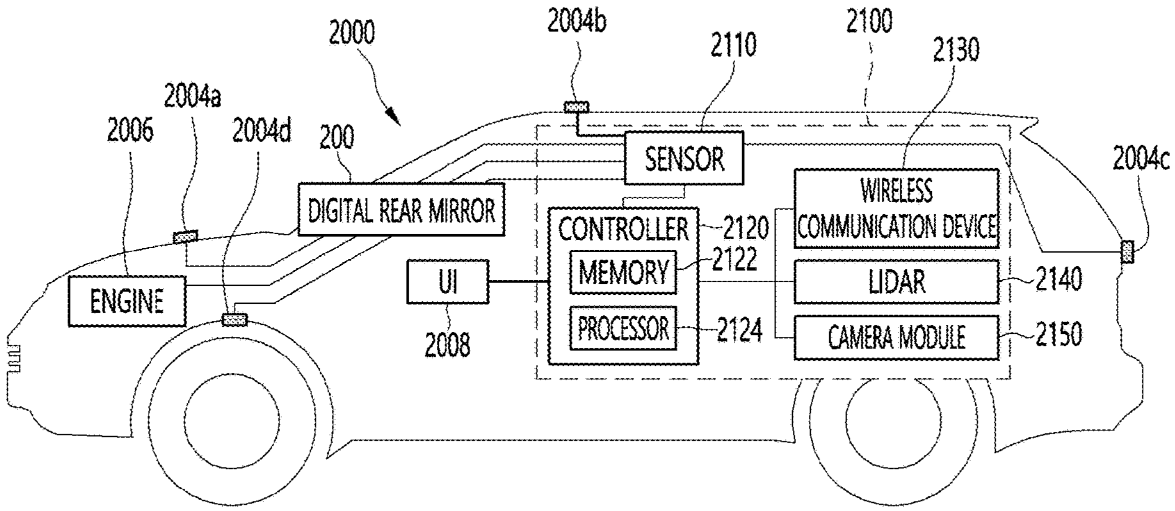
FIGS. 1 and 2 are block diagrams of a vehicle according to an embodiment of the present disclosure.
Figure 2:
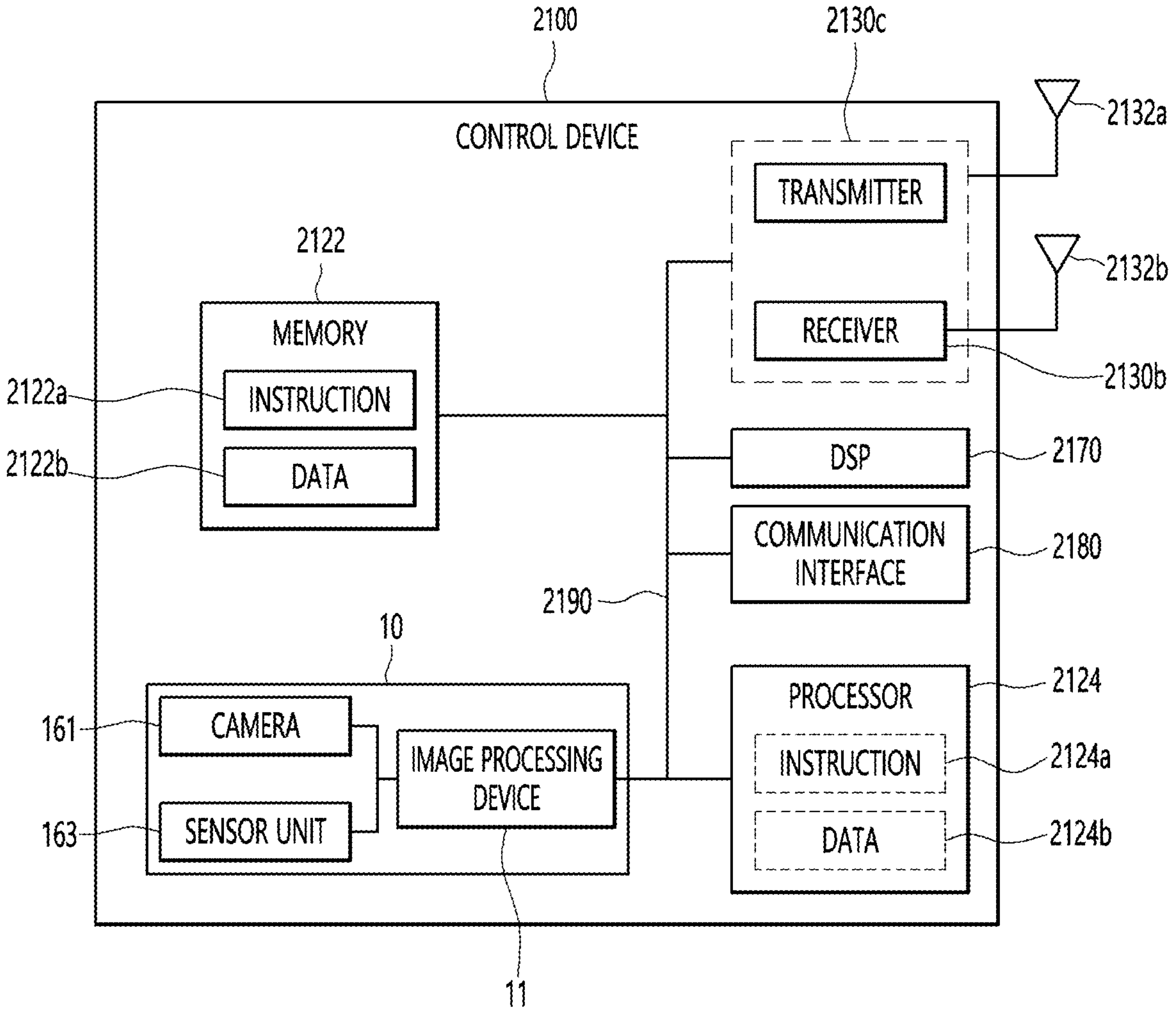

FIGS. 1 and 2 are block diagrams of a vehicle according to an embodiment of the present disclosure. In more detail, FIG. 1 is a block diagram showing a vehicle 2000 mounted with a digital rear mirror according to the embodiments, and FIG. 2 is a block diagram showing a control device 2100 of the vehicle shown in FIG. 1.

Hereinafter, the description is provided with reference to FIGS. 1 and 2.

A digital rear mirror 200 may be mounted on a vehicle 2000 according to the embodiments of the present disclosure, and the vehicle 2000 may include a control device 2100. Here, the vehicle 2000 may be an autonomous vehicle. In some embodiments, one component of the digital room mirror 200 may be integrated into one component of the control device 2100.

The control device 2100 may include a controller 2120 including a memory 2122 and a processor 2124, a sensor 2110, a wireless communication device 2130, a light detection and ranging (LiDAR) device 2140, and a camera module 2150.

The controller 2120 may be configured by a manufacturer of the vehicle at a time of manufacture or may be further configured after the manufacture to perform an autonomous driving function. Alternatively, the controller 2120 configured at the time of manufacture may be upgraded to include a configuration for performing a continuous additional function.

The controller 2120 may transmit a control signal to other components within the vehicle, including the sensor 2110, an engine 2006, a user interface (UI) 2008, the wireless communication device 2130, the LIDAR sensor 2140, and the camera module 2150. In addition, although not shown in the drawings, the controller 2120 may also transmit the control signal to an accelerator, a braking system, a steering device, or a navigation device, associated with driving of the vehicle.

The controller 2120 may control the engine 2006. For example, the controller 2120 may detect a speed limit of a road on which the vehicle 2000 drives, control the engine 2006 for a driving speed of the vehicle 2000 not to exceed the speed limit, or control the engine 2006 to accelerate the driving speed within a range that does not exceed the speed limit. In addition, when a sensing module **2004*a*, 2004*b*, 2004*c*, or 2004*d* detects an external environment of the vehicle and transmits the same to the sensor 2110, the controller 2120 may receive information on the external environment and generate a signal to control the engine 2006** or the steering device (not shown), thereby controlling the driving of the vehicle.

The controller 2120 may control the engine 2006 or the braking system to decelerate the driving vehicle when another vehicle or an obstacle is present in front of the vehicle, and control the trajectory, driving route, and steering angle of the vehicle in addition to its speed. Alternatively, the controller 2120 may control the driving of the vehicle by generating a necessary control signal based on recognition information of other external environments such as the driving lane marking and driving signal of the vehicle.

The controller 2120 may also control the driving of the vehicle by communicating with a surrounding vehicle or a central server in addition to generating its own control signal, and transmitting an instruction to control a surrounding device based on the received information.

In addition, it may be difficult to accurately recognize the vehicle or the lane marking when changing the position or angle of view of the camera module 2150. Therefore, to inhibit this difficulty, the controller 2120 may generate the control signal to control the camera module 2150 to perform its calibration. Therefore, the controller 2120 may generate the calibration control signal for the camera module 2150, thereby continuously maintaining the normal mounting position, direction, angle of view, or the like of the camera module 2150 even if the mounting position of the camera module 2150 is changed due to vibration or impact caused by a movement of the autonomous vehicle 2000. The controller 2120 may generate the control signal to perform the calibration of the camera module 2150 when the prestored initial mounting position, direction, and angle of view information of the camera module 2150 and the initial mounting position, direction, and angle of view information of the camera module 2150 that are measured during the driving of the autonomous vehicle 2000 are different from each other by a threshold value or more.

The controller 2120 may include the memory 2122 and the processor 2124. The processor 2124 may execute software stored in the memory 2122 based on the control signal of the controller 2120. In detail, the controller 2120 may store, in the memory 2122, data and instructions for detecting a view image from a rear image of the vehicle 2000, and the instructions may be executed by the processor 2124 to implement at least one method disclosed herein.

Here, the memory 2122 may be stored on a non-volatile storage medium executable by the processor 2124. The memory 2122 may store software and data by using a suitable internal or external device. The memory 2122 may include the memory device 2122 connected to a random access memory (RAM), a read only memory (ROM), a hard disk, or a dongle.

The memory 2122 may store at least an operating system (OS), a user application, and executable instructions. The memory 2122 may also store application data and array data structures.

The processor 2124 may be a microprocessor or a suitable electronic processor such as the controller, a microcontroller, or a state machine.

The processor 2124 may be implemented as a combination of computing devices, and the computing device may be a digital signal processor, the microprocessor, or a suitable combination thereof.

In addition, the control device 2100 may monitor an internal or external feature of the vehicle 2000 and detect its state by using at least one sensor 2110.

The sensor 2110 may include at least one sensing module 2004, and the sensing module 2004 may be disposed at a specific position of the vehicle 2000 based on a detection purpose. The sensing module 2004 may be disposed on the bottom, rear, front, top, or side of the vehicle 2000, and also be disposed at the internal part, tire, or the like of the vehicle.

In this way, the sensing module 2004 may detect information related to the driving, such as the engine 2006, the tire, the steering angle, the speed, or a vehicle weight, as internal information of the vehicle. In addition, at least one sensing module 2004 may include an accelerometer sensor 2110, a gyroscope, an image sensor 2110, a radio detection and ranging (RADAR) device, an ultrasonic sensor, a LiDAR sensor, or the like, and may detect movement information of the vehicle 2000.

The sensing module 2004 may also receive specific data on a state of the external environment, such as information on a state of a road on which the vehicle 2000 is disposed, information on the surrounding vehicle, and the weather, and detect a parameter of the vehicle based thereon. The detected information may be stored in the memory 2122 for a short or long term based on the purpose.

The sensor 2110 may integrate and collect information from the sensing modules 2004 for collecting the information generated in the interior or exterior of the vehicle 2000.

The control device 2100 may further include the wireless communication device 2130.

The wireless communication device 2130 may implement wireless communication of the vehicle 2000. For example, the wireless communication device 2130 may enable the vehicle 2000 to communicate with a user mobile phone, or another wireless communication device 2130, another vehicle, a central device (traffic control device), a server, or the like. The wireless communication device 2130 may transmit and receive a wireless signal according to a wireless access protocol. The wireless communication protocol may be wireless-fidelity (Wi-Fi), Bluetooth, long-term evolution (LTE), code division multiple access (CDMA), wideband code division multiple access (WCDMA), or global systems for mobile communications (GSM), and is not limited thereto.

In addition, the vehicle 2000 may also implement inter-vehicle communication through the wireless communication device 2130. That is, the wireless communication device 2130 may communicate with another vehicle or other vehicles on the road based on vehicle-to-vehicle (V2V) communication. The vehicle 2000 may transmit and receive information such as driving warnings and traffic information through the V2V communication, and request information or receive a request from another vehicle. For example, the wireless communication device 2130 may perform the V2V communication by using a dedicated short-range communication (DSRC) device or a cellular-V2V (C-V2V) device. In addition, the wireless communication device 2130 may implement communication (vehicle to everything (V2X) communication) between the vehicle and another object (for example, an electronic device carried by a pedestrian) in addition to the V2V communication.

In addition, the control device 2100 may include the LIDAR device 2140. The LIDAR device 2140 may detect a surrounding object of the vehicle 2000 during its operation by using data detected by the LIDAR sensor. The LIDAR device 2140 may transmit detected information to the controller 2120, and the controller 2120 may operate the vehicle 2000 based on the detected information. For example, the controller 2120 may instruct the vehicle to reduce its speed using the engine 2006 when the detection information indicates a slow-moving vehicle ahead. Alternatively, the controller 2120 may instruct the vehicle to reduce its entry speed based on a curvature of a curve into which the vehicle enters.

The control device 2100 may further include the camera module 2150. The controller 2120 may extract object information from an external image captured by the camera module 2150, and process this information.

In addition, the control device 2100 may further include an imaging device for recognizing the external environment. The control device 2100 may use the RADAR device, a global positioning system (GPS) device, a driving distance measurement device (Odometry), or another computer vision device in addition to the LIDAR device 2140, and operate the devices selectively or simultaneously as needed to enable more precise detection.

The vehicle 2000 may further include the user interface 2008 for user input to the control device 2100 described above. The user interface 2008 may allow a user to input information through appropriate interaction. For example, the user interface 2008 may be implemented as a touch screen, a keypad, a manipulation button, or the like. The user interface 2008 may transmit the user input or command to the controller 2120, and the controller 2120 may perform a vehicle control operation in response to the input or command.

In addition, the user interface 2008 may allow the vehicle 2000 to communicate with an external device of the vehicle 2000 through the wireless communication device 2130. For example, the user interface 2008 may enable the vehicle 2000 to be linked with the mobile phone, a tablet, or another computing device.

Furthermore, although the vehicle 2000 is described as including the engine 2006, the vehicle 2000 may also include a different type of propulsion system. For example, the vehicle may be powered by electric energy, hydrogen energy, or a hybrid system combining the two energies. Therefore, the controller 2120 may include a propulsion mechanism based on a propulsion system of the vehicle 2000, and provide the control signal based thereon to a component of each propulsion mechanism.

Hereinafter, the description describes a detailed configuration of the control device 2100 included in the vehicle 2000 and a digital rear mirror control configuration 10 of the vehicle in more detail with reference to FIG. 2.

The control device 2100 may include the processor 2124. The processor 2124 may be a general-purpose single or multi-chip microprocessor, a dedicated microprocessor, the microcontroller, a programmable gate array, or the like. The processor may be referred to as a central processing unit (CPU). In addition, the processor 2124 may also be used as a combination of the plurality of processors.

The control device 2100 may also include the memory 2122. The memory 2122 may be any electronic component capable of storing electronic information. The memory 2122 may also include a combination of the memories 2122 in addition to a single memory.

According to the various embodiments, the memory 2122 may also store data and instructions 2122*a* for detecting the rear image of the vehicle 2000. When the processor 2124 executes the instructions 2122*a*, all or some of the instructions 2122*a* and data 2122*b* necessary for performing the instructions may be loaded into instructions 2124*a* and data 2124*b* of the processor 2124.

The control device 2100 may include a transmitter 2130*a*, a receiver 2130*b*, or a transceiver 2130*c* to allow transmission and reception of signals. At least one antenna 2132*a* or 2132*b* may be electrically connected to the transmitter 2130*a*, the receiver 2130*b*, or each transceiver 2130*c*, and an additional antenna may be included.

The control device 2100 may also include a digital signal processor (DSP) 2170. The control device 2100 may enable the vehicle to rapidly process a digital signal by using the DSP 2170.

The control device 2100 may also include a communication interface 2180. The communication interface 2180 may include at least one port and/or communication module for connecting another device to the control device 2100. The communication interface 2180 may enable the user to interact with the control device 2100.

The various components of the control device 2100 may be connected with each other by at least one bus 2190, and the bus 2190 may include a power bus, a control signal bus, a state signal bus, a data bus, or the like. The components may transmit information to each other through the bus 2190 and perform an intended function under control of the processor 2124.

The digital rear mirror control configuration 10 of a vehicle may include a camera 161, a sensor unit 163, and an image processing device 11. The camera 161 may be included in the camera module 2150 disposed in the vehicle 2000, or may be independently installed to display the external environment of the vehicle on the digital rear mirror 200. The sensor unit 163 may be included in the sensor 2110 disposed in the vehicle 2000, or may be independently installed to detect the internal or external environment of the vehicle necessary to correct a screen displayed on the digital rear mirror 200 by using the image processing device 11.

Figure 3:
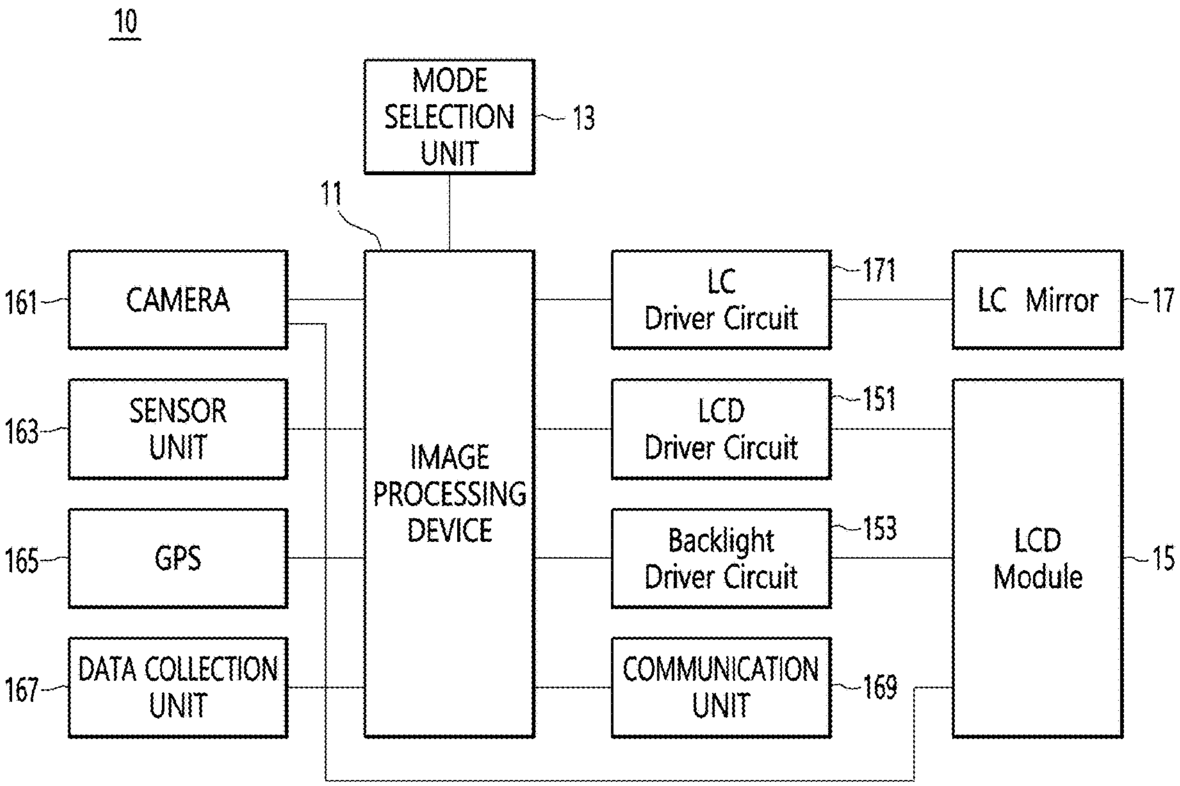
FIGS. 3 and 4 are diagrams showing a digital rear mirror control configuration of the vehicle according to an embodiment of the present disclosure.
Figure 4:
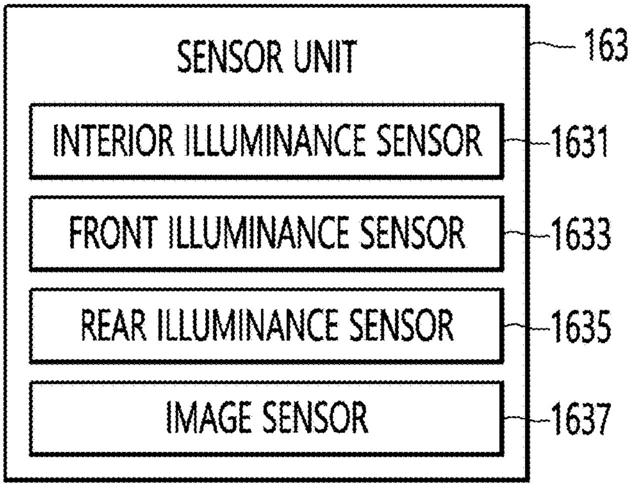

FIGS. 3 and 4 are diagrams showing the digital rear mirror control configuration of the vehicle according to an embodiment of the present disclosure.

Hereinafter, the description is provided with reference to FIGS. 3 and 4.

The digital room mirror control apparatus 10 may perform complex functions of providing a driver with a rear view in real time through interconnection of various components and controlling this provision. Each component may be closely connected to each other while functioning independently, contributing to accurately and efficiently showing a rear situation while the vehicle drives, and may also provide the driver with necessary information from external environment information as needed.

Each component is described below in more detail with reference to FIG. 3.

For example, the camera 161 may be mounted on the rear of the vehicle. The camera 161 may capture the rear situation of the vehicle in real time and transmit the corresponding image to a data collection unit. The camera 161 may detect an obstacle, a road state, or the like at the rear and allow the driver to visually check the same. The camera 161 may be connected to the image processing device 11 and adjust the screen of the digital room mirror based on a mode selected through a mode selection unit 12.

The sensor unit 163 may collect or detect data such as illuminance (brightness), a vehicle speed, a driving distance, a lane marking change signal, or the like to thus provide information appropriate for a driving condition. For example, the image processing device 11 may adjust the brightness of the screen displayed on the digital rear mirror based on the interior and exterior illuminance of the vehicle, an external light amount, or the like, detected by the sensor unit 163.

The sensor unit 163 may include an interior illuminance sensor 1631, a front illuminance sensor 1633, a rear illuminance sensor 1635, and an image sensor 1637.

The interior illuminance sensor 1631 may be a sensor that measures the interior illuminance of the vehicle, and the front illuminance sensor 1633 may be a sensor that detects the illuminance in an external environment in front of the vehicle, and distinguishes between bright sunlight during the day and a dark environment at night, thus allowing the screen to be set brighter during the day and darker at night. This sensor may allow the digital rear mirror to react appropriately based on a time zone or a weather condition.

The rear illuminance sensor 1635 may be a sensor that measures the illuminance emitted from the rear of the vehicle. When a strong headlight of another vehicle following the vehicle or another light source is illuminated, the sensor 1635 may detect the same and adjust the screen brightness to inhibit the screen on the digital rear mirror from being excessively bright and obstructing the driver's view, thereby improving the driver's visibility when driving at night.

The image sensor 1637 may be a sensor that receives the image input from a vehicle exterior camera and analyzes a brightness state of each region on the screen, and may detect the brightness of the region and adjust the same to optimize the overall visibility of the screen if a specific region on the screen is excessively bright or dark. That is, the image sensor 1637 may enable the driver to clearly recognize the rear situation even under a non-uniform exterior lighting condition.

For example, the image processing device 11 may control the brightness of the digital rear mirror based on a difference between the interior and exterior illuminance of the vehicle through the interior illuminance sensor 1631 and the front illuminance sensor 1633. For example, the image processing device 11 may brighten the screen during the day and darken the screen at night to improve the driver's visibility.

In addition, when a strong light source emitted from the rear of the vehicle is detected by the rear illuminance sensor 1635, such as when the headlights of the another vehicle following the vehicle emit, the image processing device 11 may adjust the brightness of the digital rear mirror to reduce driver glare, and set the overall optimized brightness in this process by also considering the interior illuminance and the front illuminance.

A GPS 165 may track a real-time position of the vehicle and allow the driver to check a current road situation and a driving position. In this way, the GPS 165 may provide the driver with information on the route and surrounding situation of the vehicle from the digital rear mirror.

A data collection unit 167 may function to collect and analyze the data collected using the camera 161, the sensor unit 163, the GPS 165, or the like. In this way, the image processing device 11 may control the image displayed on the digital rear mirror by considering a vehicle state and the internal or external environment of the vehicle.

That is, the image processing device 11 may control the digital rear mirror to display an appropriate image or an object to assist the driving in real time by synthesizing the data such as the vehicle speed, a driving mode, whether the lane marking change signal is detected, and a surrounding environment of the vehicle.

For example, the image processing device 11 may adjust the screen based on the situation by controlling a liquid crystal display (LCD) driver circuit 151, a backlight driver circuit 153, or the like based on the information collected by the data collection unit 167. In addition, the image processing device 11 may be connected to a transmission device (not shown) to automatically display the image from a rear camera when the vehicle moves backwards.

The transmission device may detect a gear state, and the image processing device 11 connected thereto may automatically output the image from the rear camera to the digital rear mirror when the vehicle moves backwards. For example, the image processing device 11 may immediately display the image from the rear camera on the rear mirror when a reverse gear is recognized through the transmission device. Here, the image processing device 11 may also control the LCD driver circuit 151 and the backlight driver circuit 153 to be linked with each other to clearly display the screen.

Figure 5:
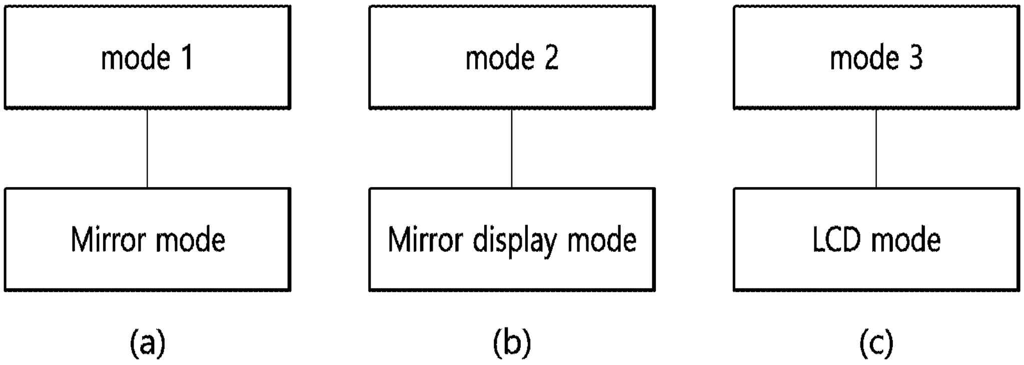
FIG. 5 is a diagram showing a control mode according to an embodiment of the present disclosure.

A mode selection unit 13 may select one of a mirror mode (a), a mirror display mode (b), and an LCD mode (c) as shown in FIG. 5, and a selection criterion may be variously set by the above-described configurations. For example, the image processing device 11 may control a vehicle rear mirror to be switched to the digital rear mirror or to be maintained as a general mirror based on a mode selected by the driver through the mode selection unit 13.

A liquid crystal (LC) mirror 17 indicates a mirror having a special structure in which the mirror functions as the general mirror, and may also be switched to a digital display as needed. The LC mirror 17 may be connected to an LC driver circuit 171, and switched to the digital room mirror as needed, thus providing the rear view accurately.

In addition, the LC driver circuit 171 may be linked to the image processing device 11, and the image processing device 11 may control the mirror to be switched to the digital room mirror or maintained as the general mirror based on the mode selected by the driver through the mode selection unit 13, and control the LC mirror 17 to adjust the reflectivity, screen switching, or the like of the mirror through an electric signal.

The LCD driver circuit 151 may control an LCD module 15 to display the image entering from the rear camera to the driver. The LCD driver circuit 151 may function to adjust the brightness, color, contrast ratio, or the like of the display. The LCD driver circuit 151 may be linked to the image processing device 11, and the image processing device 11 may allow the image received from the camera 161 to be displayed on the screen accurately and clearly, and optimize the brightness and image quality of the screen by operating the LCD driver circuit 151 together with the backlight driver circuit 153.

The backlight driver circuit 153 may be linked to the image processing device 11, and the image processing device 11 may control backlight that provides light from behind the LCD screen for the screen to maintain appropriate brightness based on surrounding brightness. For example, the image processing device 11 may automatically adjust the backlight brightness for the driver to view the screen brightly during the day and without the glare at night.

A communication unit 169 may communicate with an electronic control unit (ECU) of the vehicle and exchange information between a digital room mirror system and another system in the vehicle. In this way, the digital rear mirror may be operated seamlessly with another system in the vehicle.

As an example, the image processing device 11 may receive real-time data from a traffic situation application programming interface (API) and a weather agency API through the communication unit 169, and receive information on road congestion and accidents through the traffic situation API to assist the driver to understand a traffic flow on his/her current route. In addition, the image processing device 11 may receive real-time weather information through the weather agency API for the digital room mirror to automatically adjust the brightness or the screen display based on a weather change, thereby improving safety of the driving. The digital room mirror may also display the traffic situation or real-time weather information on the digital rear mirror.

In addition, for example, the communication unit 169 may be connected to the image processing device 11 and exchange various information such as the vehicle state, the driving speed, the transmission state, and the lane marking change signal detection. In this way, the communication unit 169 may transmit an instruction related to providing the rear view.

The LCD module 15 may provide the image received from the camera 161 to the driver in real time. The LCD module 15 may allow the driver to accurately check the rear situation or information for the convenience and safety of the driver through the high-resolution screen, may be linked to the LCD driver circuit 151, the backlight driver circuit 153, and the camera 161 to clearly output the rear image, may receive the instruction from the image processing device 11 to thus provide the optimal visibility under various driving conditions, and may display various objects for the convenience and safety of the driver.

Through the above-described configuration, the camera 161 may capture the rear image in real time, and this image may be transmitted to the data collection unit 167. The sensor unit 163 may detect the surrounding environment of the vehicle and provide brightness or distance data, and the GPS 165 may provide the position and route information of the vehicle. All the data may be transmitted to the image processing device 11, and used for the image processing device 11 to control the LCD driver circuit 151 and backlight driver circuit 153 based on the situation, and optimize the brightness and image quality of the screen. In addition, the image processing device 11 may be connected to the transmission device 13 to allow the image from the rear camera to be automatically output to the LCD module 15 when the vehicle moves backwards, the mode selection unit 13 may select a desired mode of the driver and transmit the instruction to the image processing device 11, and the image processing device 11 may thus selectively display the image from the rear camera or perform the mirror function.

FIG. 5 is a diagram showing a digital rear mirror control mode of the vehicle according to an embodiment of the present disclosure.

The mirror mode (a) indicates a mode in which the mirror reflects the rear situation like a traditional rear mirror without using any digital function, the digital display is turned off, and the mirror reflects a vehicle interior and a physical situation at the rear as they are like the general mirror. The mirror mode (a) may be display-independent and thus be operated independently of power or an electronic system.

The mirror display mode (b) indicates a hybrid mode in which the functions of the mirror and the digital display are combined to each other. In this mode, some of the mirror functions are maintained even when the digital display is turned on, thus allowing the driver to also use the reflection function of the mirror while viewing the rear situation through the digital screen. Through this configuration, the driver may also check some parts that are not captured by the rear camera.

For example, in the mirror display mode (b), the object (e.g., character) may be displayed while maintaining the reflection function of the general mirror.

The LCD mode (c) may function to display the image captured by the rear camera 161 in real time on the LCD display. In this mode, the digital screen may use its entire area, and provide the driver with more information than the physical mirror through a wide viewing angle of the rear camera. The LCD mode may be useful in the dark environment or a situation of limited visibility, and allow the driver to view the rear situation clearly through the camera image.

Each of the above-described modes may be selected through the mode selection unit 13.

Figure 6:
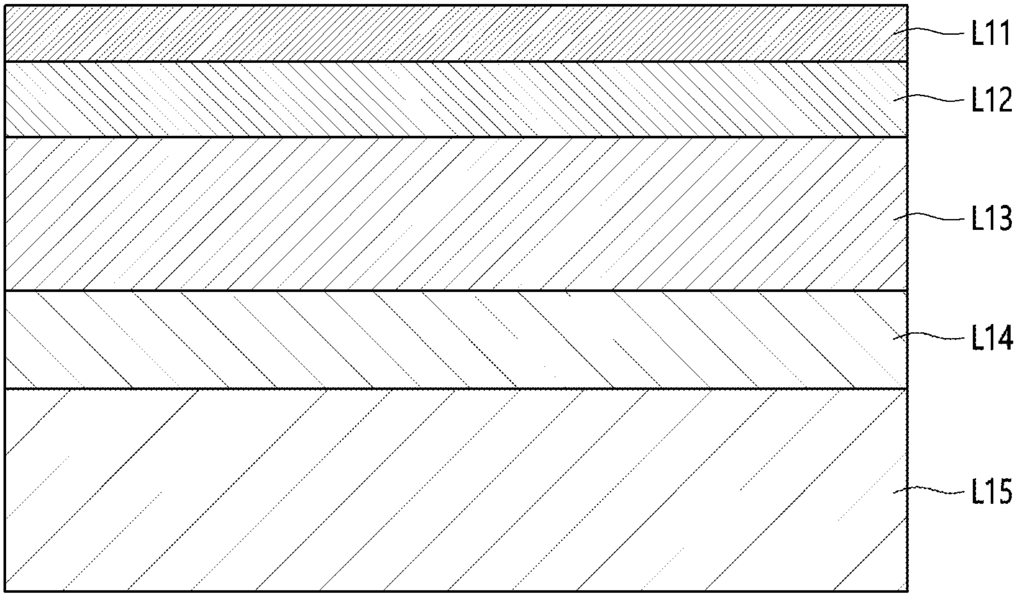
FIGS. 6 and 7 are diagrams showing a structure of a display according to an embodiment of the present disclosure.
Figure 7:
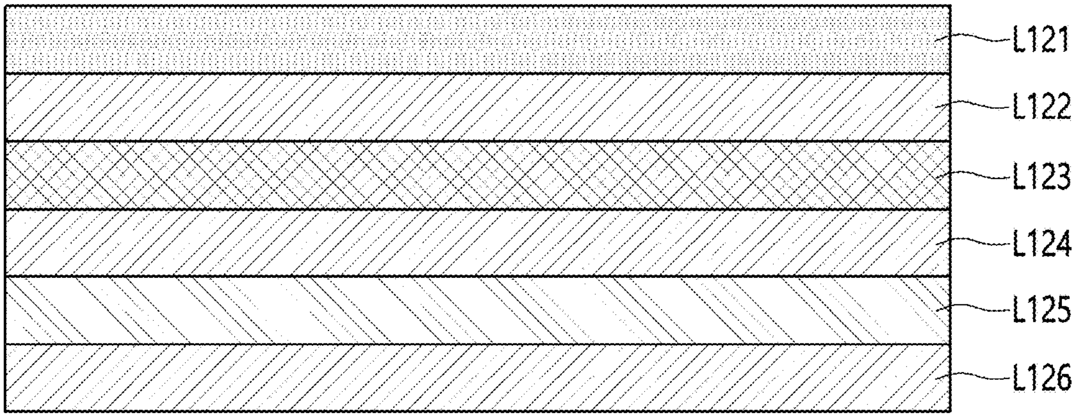
Figure 8:
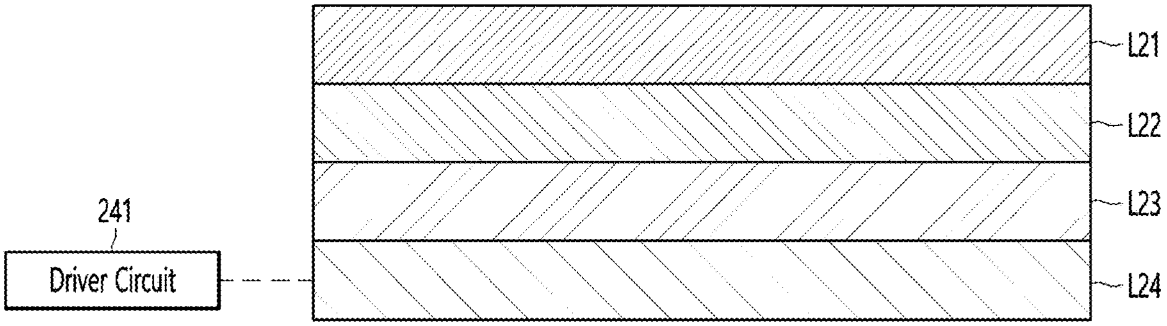
FIG. 8 is a diagram showing a structure of a display according to an embodiment of the present disclosure.

FIGS. 6 to 8 are diagrams showing a structure of the display according to an embodiment of the present disclosure. In more detail, FIG. 6 is a diagram showing a laminated structure of a mirror display according to an embodiment, FIG. 7 is a diagram showing a laminated structure of an upper polarizer L12 shown in FIG. 6, and FIG. 8 is a diagram showing a laminated structure of the display to which a micro LED is applied according to an embodiment.

First, the description is provided with reference to FIGS. 6 and 7.

The display according to an embodiment of the present disclosure may be formed by laminating a coating layer L11, the upper polarizer L12, a liquid crystal display panel L13, a lower polarizer L14, and a backlight L15, and referring to FIG. 7, the upper polarizer L12 may be formed by laminating a protective layer L121, a triacetyl cellulose (TAC) layer L122, a mirror film L123, a TAC layer L124, a polyvinyl alcohol (PVA) layer L125, and a TAC layer L126.

In more detail, the coating layer L11 may indicate a layer formed of at least one of various coating solutions for improving performance of the display, and may include, for example, an anti-reflective (AR) coating solution, an oleophobic coating solution, a hydrophobic coating solution, a scratch-resistant coating solution, or an ultraviolet (UV)-blocking coating solution.

The anti-reflective coating solution may reduce light reflection that may occur on a display screen, thus allowing the driver to view the screen more clearly. The oleophobic coating solution may inhibit fingerprints or oil stains from easily appearing on a display surface. The hydrophobic coating solution may inhibit moisture or water droplets from remaining on the display surface, thus inhibiting condensation caused by moisture or a rapid temperature change in the vehicle interior.

In addition, the scratch-resistant coating solution may protect the display from being damaged by external impact or friction and function to increase long-term durability, and the UV-blocking coating solution may inhibit the screen from being discolored or damaged by ultraviolet (UV) rays when the display is exposed to sunlight for a long time.

The upper polarizer L12 may include several layers to maintain polarization performance of the display, respond to the external environment, and provide the user with a clear screen, and each layer may perform a specific function, which may be described below with reference to FIG. 7.

The liquid crystal display panel L13 may clearly display the image received from the rear camera 161 in real time, provide a wide viewing angle, and automatically adjust its brightness for day and night. In addition, the liquid crystal display panel L3 may inhibit the glare caused by strong light, and accurately convey the rear situation with a high-resolution image quality and a fast response speed.

The lower polarizer L14 may function as a filter that allows light to pass through only in a specific direction by controlling a light vibration direction to optimize the performance of the display. In particular, the lower polarizer L14 may function to transmit light generated from the backlight L15 in the specific direction, and be operated together with the upper polarizer L12 to adjust the transmission and blocking of light, thereby providing a clear image on the display.

In addition, a liquid crystal display (LCD) panel itself does not emit light, and the image may thus be visualized by light provided from behind the screen through the backlight L15. For example, the backlight L15 may provide high efficiency and high brightness by using light-emitting diodes.

In addition, for example, the display in this embodiment may use a mini light-emitting diode (LED) display, and in this case, the backlight L15 may use thousands of small mini LED elements as the backlight, and control light independently for each small region (local dimming zone). In this case, the backlight L15 may adjust the brightness of each zone using the numerous local dimming zones to thus allow bright and dark regions to be separately expressed even in a dark scene, thereby improving the driver's visibility.

Meanwhile, in the upper polarizer L12, the protective layer L121, the triacetyl cellulose (TAC) layer L122, the mirror film L123, the TAC layer L124, the polyvinyl alcohol (PVA) layer L125, and the TAC layer L126 may be laminated between the coating layer L11 and the liquid crystal display panel L13.

The protective layer L121 may protect a polarizing film from physical impact or scratches, and inhibit its deformation due to moisture and heat, thereby increasing durability of the film. For example, the protective layer L121 may inhibit the film from being damaged or discolored by direct sunlight through its ultraviolet (UV) blocking function. In addition, the protective layer may maintain optical transparency of the film while performing the functions described above, thereby maintaining the clarity and brightness of the screen.

The TAC layers L122, L124, and L126 may be sequentially arranged between the mirror film L123 and the PVA layer L125 to protect the mirror film L123 and the PVA layer L125.

The mirror film L123 may function to provide a reflective function like the general mirror even when the digital display is turned off. The mirror film using a half mirror structure may partially transmit and partially reflect light, thus allowing the digital display to display the image from the rear camera when turned on and to function as the mirror when turned off. In this way, the digital rear mirror may be used as a hybrid device that simultaneously provides both digital image display and traditional mirror functions, thus allowing the driver to flexibly use both the functions based on the situation. As a result, the mirror film may increase versatility of the display, and provide a convenient solution that supports both digital and analog functions as needed.

The TAC layers L122 and L124 may be disposed above and below the mirror film L123 to thus protect the mirror film L123 from moisture, ultraviolet rays, the physical impact, or the like, thereby inhibiting damage and increasing durability of the film. In addition, the TAC layers L122 and L124 may function to maintain the optical transparency without obstructing the transmission of light, thereby ensuring a clear image quality of the display.

For the display to provide the clear image, the PVA layer L125 may allow light to pass through only in the specific direction by adjusting the light vibration direction and polarizing light. Through this process, the PVA layer L125 may function to allow the image received from the rear camera to be accurately displayed and reduce the glare, thereby improving the driver's view.

However, the PVA layer L125 is very sensitive to moisture, UV rays, and the physical impact, and the TAC layers L124 and L126 may thus be required to protect the PVA layer L125. The TAC layers L124 and L126 may be laminated above and below the PVA layer L125, and each function as a protective film to inhibit the PVA layer L125 from being damaged or having a lower function due to the external environment. The TAC layers L124 and L126 may block moisture and UV rays, and protect the PVA layer L125 from the physical impact, while maintaining the optical transparency to assist in inhibiting light distortion.

Through the structure described above, the digital rear mirror in this embodiment may stably maintain the function of the polarizing film even in the various environments and provide the clear image quality and excellent visibility of the display.

FIG. 8 is a diagram showing the laminated structure of the display to which the micro LED is applied according to an embodiment. The display in this embodiment may include a coating layer L21, a filter layer L22, a light source array layer L23, and an electrode layer L24, and the electrode layer L24 may be connected to a driver circuit 241.

The coating layer L21 may function to protect the display surface and protect the other layers from the external environment. This coating layer L21 may protect the display from scratches and dirt, and also provide hydrophobic and oleophobic properties. In addition, the coating layer L21 may optimize transmittance of the display to make the screen look clearer. That is, the coating layer L21 may increase durability of the display and provide a stable environment for effective operation of subsequent layers.

The filter layer L22 may function to improve color reproducibility of the display by selectively transmitting or blocking light of a specific wavelength. The filter layer L22 may serve an important function in improving the viewing angle, especially by balancing red, green, and blue (RGB) colors and minimizing external light reflection. The filter layer may assist light emitted from the light source array layer to be expressed in more accurate colors, and filter external light transmitted through the coating layer L21 to inhibit external light from being reflected, thereby increasing the driver's visibility.

The light source array layer L23 may be a layer where micro LED pixels are arranged, and each micro LED pixel may emit light on its own to form a high-resolution image. The light source array layer (micro LED pixel array layer) L23 may be connected to the filter layer L22 to thus determine the color and the brightness displayed on the display, and receive the signals from the electrode layer L24 and the driver circuit 241 to thus drive individual pixels, thereby controlling the image of the entire screen.

The electrode layer L24 may function to activate each pixel by supplying a current to the light source array layer L23. The electrode layer L23 may precisely transmit electricity to a specific pixel to thus form the image by turning on or off only pixels in a desired position, and to this end, the electrode layer L23 may control the micro LED pixels based on the signal received from the driver circuit 241.

The driver circuit 241 may be responsible for an overall control function of the display system, and transmit the correct current and signal to each pixel. This driver circuit 241 may analyze the image to be displayed on the display, calculate an electrical signal required for each pixel of the image, and transmit the same to the electrode layer. The driver circuit may have a direct influence on the resolution, brightness, and color expression of the display, and enable the light source array layer to implement the accurate image through signal processing.

Figure 9:
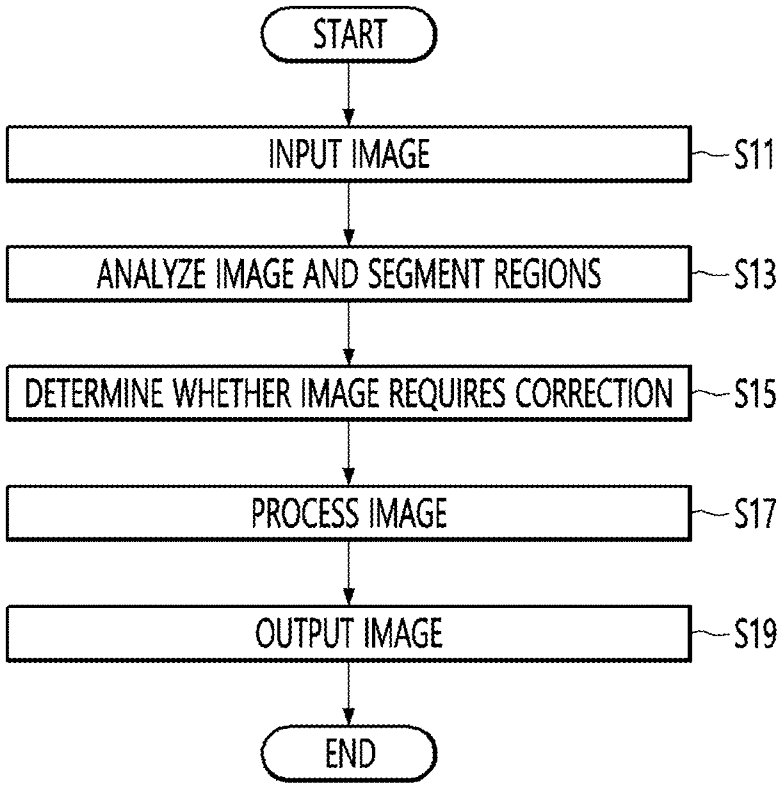
FIGS. 9 and 10 are flowcharts showing a digital rear mirror control method of a vehicle under control of an image processing device according to an embodiment of the present disclosure.
Figure 10:
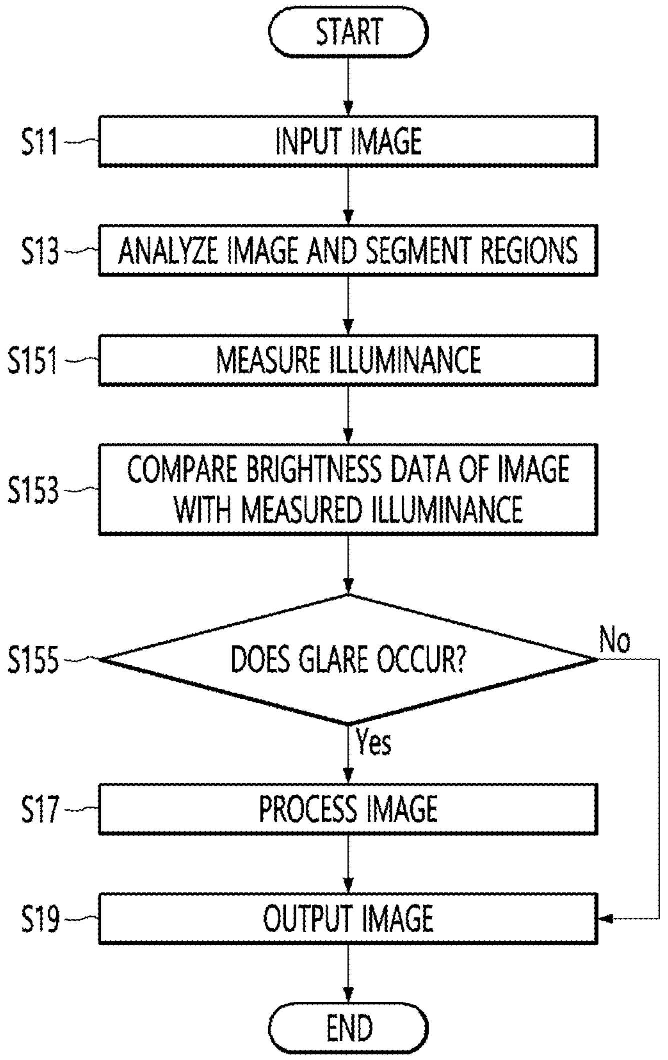

FIGS. 9 and 10 are flowcharts showing a digital rear mirror control method of a vehicle under control of the image processing device according to an embodiment of the present disclosure.

Hereinafter, the description is provided with reference to FIGS. 9 and 10.

The control method in this embodiment may include an image input step (S11), an image analysis and region segmentation step (S13), an image correction determination step (S15), an image processing step (S17), and an image output step (S19).

The image input step (S11) may be a step of inputting the external environment of the vehicle to the digital rear mirror control apparatus from the camera 161. Here, the camera 161 may capture a surrounding situation of the vehicle and provide image data required for the digital room mirror system. The input image may be processed and adjusted in a subsequent step, thus allowing the driver to check the rear situation of the vehicle or its surrounding environment more clearly.

The image analysis and region segmentation step (S13) may be a step of analyzing the input image in the step (S11) based on various criteria and segmenting the same into a plurality of regions. Here, the image processing device 11 may analyze the image based on the pixel value or histogram of the input image, and perform a task of distinguishing the bright and dark regions. The image processing device 11 may collect the brightness and contrast information of a specific position through region segmentation and use the same for the subsequent image processing task.

The image correction determination step (S15) may be a step of determining whether to correct the image based on the exterior and interior situations of the vehicle. For example, the image correction may be determined based on the interior or exterior illuminance of the vehicle that is collected by the sensor unit 163, and the brightness of the corresponding region may then be adjusted in the image processing step (S17), which is described below in more detail with reference to FIG. 10.

In the image processing step (S17), the brightness adjustment may be performed for the region requiring the correction based on results of the image analysis and region segmentation step (S13) and the image correction determination step (S15) for the input image.

In more detail, the digital rear mirror 200 may clearly express the rear situation of the vehicle by adjusting the brightness of the region if a brightness value of the segmented region is out of a threshold range. For example, the digital rear mirror 200 may optically reflect the rear situation of the vehicle based on the electrical signal by using the LC mirror 17 or output the image optimized by the micro LED pixel array layer L23 through the display.

In addition, this image processing step (S17) may be performed by using a convolutional neural network (CNN) to detect and adjust the brightness of the specific region. In detail, when the rear situation of the vehicle is input in real time by the camera 161 connected to the digital rear mirror, the image may be input by including strong light such as the headlights of the following vehicle.

The image processing device 11 may perform a preprocessing process for the input image to allow the CNN to effectively process the image, and the preprocessing process may include the noise removal, the resolution adjustment, the color correction, or the like as described above.

In addition, the brightness of the image may be analyzed through feature extraction, activation function, pooling, and segmentation processes of the preprocessed image by the image processing device 11.

The feature extraction (by the convolution Layer) may be performed by using a plurality of filters to detect a feature (i.e., specific pattern in the image) of the rear headlight and recognize the shape and edge of the headlight. The activation function (ReLU) may be used to introduce nonlinearity to maintain only an important feature, and the pooling (by a pooling layer) may reduce a size of a feature map to thus reduce a calculation amount, and maintain spatial invariance, thereby selectively maintaining the most important information. The segmentation (by a segmentation layer) may accurately distinguish a region where strong light is emitted by emphasizing a specific headlight region to thus generating a binary mask.

As described above, the brightness of the headlight region detected by the image processing device 11 to which the CNN is applied may be selectively adjusted, and additionally, the driver may be provided with the improved visibility through a post-processing process such as the contrast adjustment, color correction, or the like of the image.

In addition, the digital rear mirror control apparatus may collect the position data of the vehicle by using the GPS 165 and the data collection unit 167, and the communication unit 169 may enable the data exchange with an external system as needed. Through the above-described configuration, the digital rear mirror control apparatus may respond in real time to the surrounding situation and the illuminance change while driving the vehicle, and perform the image adjustment based on a current position of the vehicle and the surrounding environment.

Meanwhile, the image correction determination step (S15) may include an illuminance measurement step (S151), a step (S153) of comparing brightness data of the image with the measured illuminance, and a step (S155) of determining whether the glare occurs.

The illuminance measurement step (S151) may be a step of measuring the interior or exterior illuminance of the vehicle by the sensor unit 163. For example, the image processing device 11 may determine that the image requires the correction if an illuminance value measured by the rear illuminance sensor 1635 is greater than an illuminance value measured by the front illuminance sensor 1633. That is, illuminance measurement data may be collected in real time and used for the image correction by the image processing device.

The step (S153) of comparing the brightness data of the image with the measured illuminance may be a step of comparing the brightness value of each region that is acquired through the image analysis with the measured illuminance value. Here, the measured illuminance value may be derived using the illuminance measured by the interior illuminance sensor 1631, the front illuminance sensor 1633, the rear illuminance sensor (1635), or the like. For example, the measured illuminance value may indicate the illuminance value measured by the rear illuminance sensor 1635, a difference between the illuminance value measured by the rear illuminance sensor 1635 and the illuminance value measured by the front illuminance sensor 1633, or a difference between the illuminance value measured by the interior illuminance sensor 1631 and the illuminance value measured by the exterior illuminance sensor 1633 or 1635.

That is, the image processing device 11 may determine that the image requires the correction if there is a possibility of the glare (S155) as a result of comparing the illuminance measurement with the brightness data (S153). For example, the image processing device 11 may reduce the reflectivity of the digital rear mirror or adjust the brightness for the driver to clearly view a vehicle exterior situation without glare if the rear illuminance sensor 1635 measures a high value and the front illuminance sensor 1633 measures a relatively low value.

In more detail, the image processing device 11 may adjust the brightness of each region in the image processing step (S17) if the glare occurs (Yes in S155). If the brightness value of the specific region is out of the threshold range in this image processing step (S17), the brightness of the region may be adjusted to allow the image output to the digital rear mirror to have more balanced brightness and clarity in the image output step (S19). In addition, the image processing device 11 may be linked with the mode selection unit 13 and apply various image output modes based on the situation.

That is, the image corrected in the image processing step (S17) may be finally output through the LCD module or the micro LED display (S19). Here, the image processing device 11 may also output display brightness in an adjusted state, and set the final display brightness based on the illuminance value measured by the sensor.

For example, the LC mirror 17 may include the mirror film L23 that outputs a vehicle exterior image or optically reflect the rear situation based on the electrical signal. The communication unit 169 may exchange the data with a vehicle interior system, and the GPS 165 and the data collection unit 167 may collect the position and driving data of the vehicle to thus reflect an environmental change when correcting the illuminance and outputting the image. These elements may support an organic operation of the entire system and display the rear situation more clearly by selecting one of the various modes based on the situation.

That is, if the LCD display is applied to the digital rear mirror, the backlight driver circuit 153 linked to the LCD module 15 may precisely adjust the brightness at the time of outputting the image and adjust the reflectivity of the mirror film based on the exterior illuminance change to provide the user with the optimal view, and if the micro LED display is applied to the digital rear mirror, the brightness at the time of outputting the image may be precisely adjusted through the electrode layer L24 and the driver circuit 241.

Figure 11:
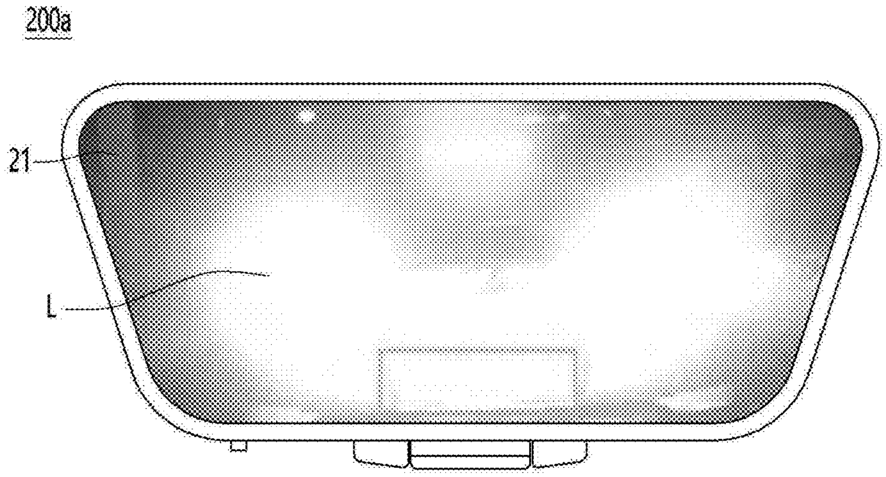
FIGS. 11 and 12 are diagrams showing an implementation example of digital rear mirror control of a vehicle according to an embodiment of the present disclosure.
Figure 12:
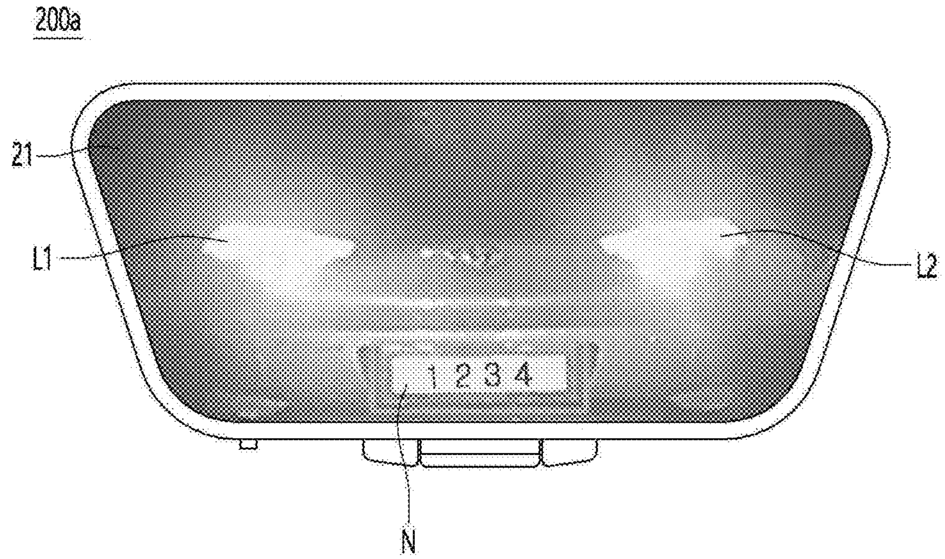

FIGS. 11 and 12 are diagrams showing an implementation example of digital rear mirror control of a vehicle according to an embodiment of the present disclosure. In more detail, FIG. 11 is a diagram showing an example of a case where the object is not clearly displayed on a display 201 due to strong light L occurring from the rear of the vehicle through a digital rear mirror 200*a* or the strong light L causes glare to the driver, and FIG. 12 is a diagram showing an example in which light sources L1 and L2 and an object N that is not clearly displayed due to the light sources L1 and L2 are displayed by adjusting and outputting the image input through the control method and device in this embodiment.

Figure 13:
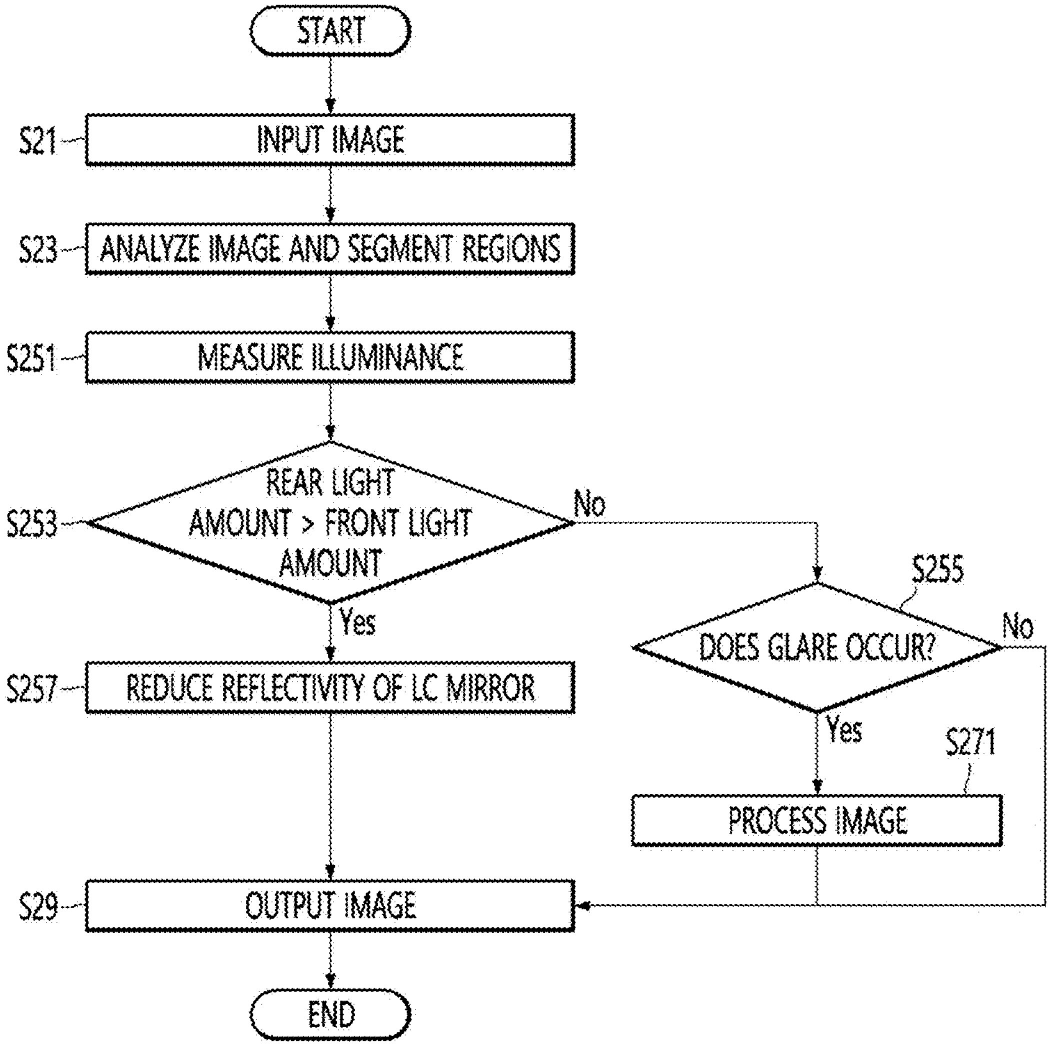
FIGS. 13 and 14 are flowcharts showing a digital rear mirror control method of a vehicle under control of an image processing device according to an embodiment of the present disclosure.
Figure 14:
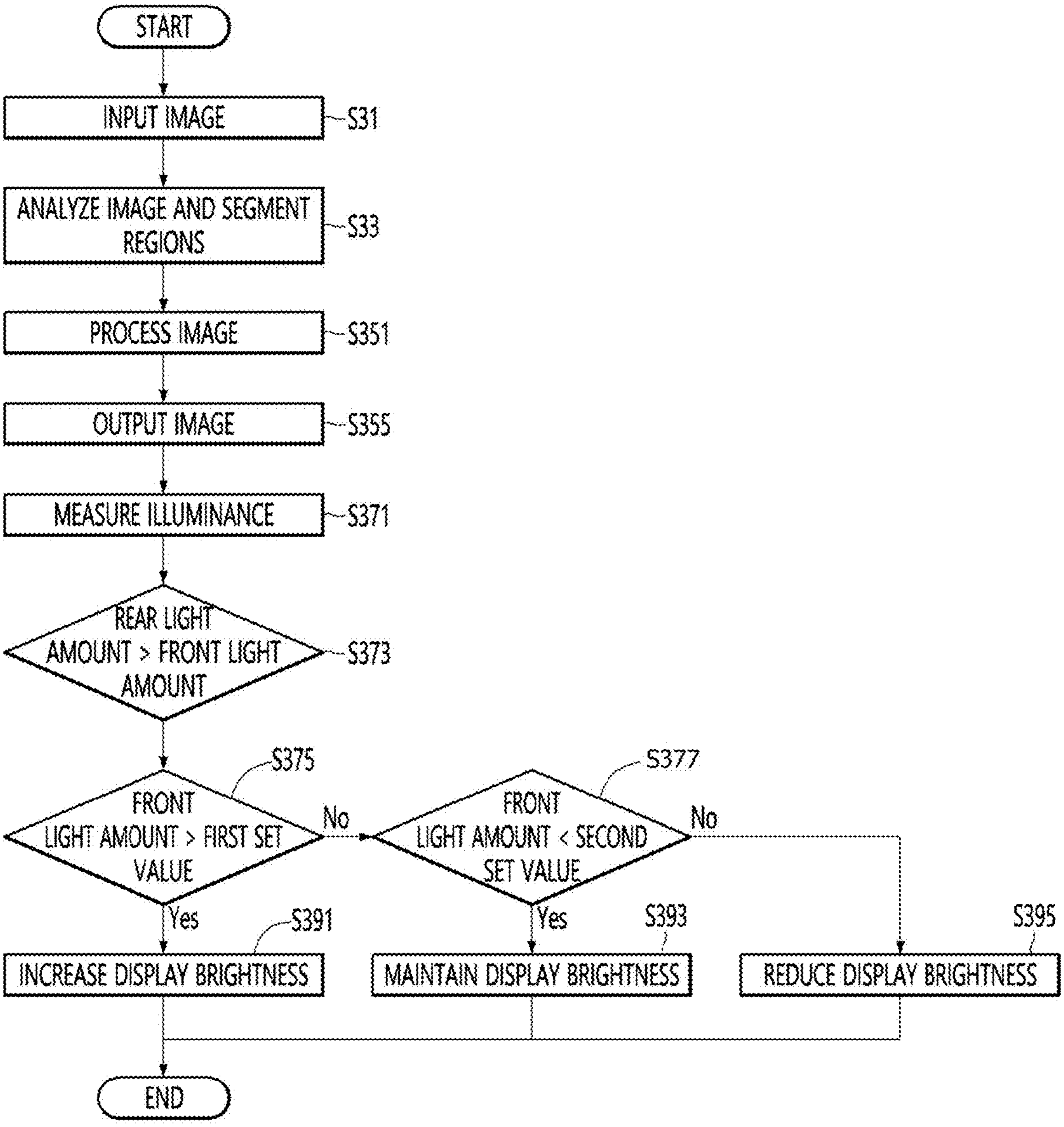

FIGS. 13 and 14 are flowcharts showing a digital rear mirror control method of a vehicle under the control of the image processing device according to an embodiment of the present disclosure, and any descriptions overlapping with the content of the embodiment described with reference to FIG. 9 or 10 are omitted.

Referring to FIG. 13, the digital rear mirror control method of a vehicle according to this embodiment may sequentially perform an image input step (S21), an image analysis and region segmentation step (S23), and an illuminance measurement step (S251).

In addition, based on the illuminance measured in the illuminance measurement step (S251), the image processing device 11 may compare the front and rear light amounts (or illuminance) measured by the front illuminance sensor 1633 and the rear illuminance sensor 1635, and if the rear light amount is greater than the front light amount (Yes in S253), the image processing device 11 may reduce the reflectivity of the LC mirror 17 to less than 40% (S257) and output the image (S29), thereby inhibiting the driver glare and improving the visibility.

Meanwhile, if the rear light amount is smaller than the front light amount (No in S253), the image processing device 11 may determine whether glare occurs (S255), perform the image processing (S271), and then output the image to the display (S29). Here, the criterion for determining whether glare occurs in the step (S255) may be based on the interior and exterior illuminance values of the vehicle, measured by the sensor unit 163.

Referring to FIG. 14, the digital rear mirror control method of a vehicle according to this embodiment may sequentially perform an image input step (S31), an image analysis and region segmentation step (S33), an image processing step (S351), and an image output step (S355), and the image adjusted by considering various conditions through the above-described control flow may be output to the display (S355).

In addition, after the image output step (S355), the image processing device 11 may measure the illuminance by using the sensor unit 161 (S371), and compare the front and rear light amount (or illuminance) measured by the front illuminance sensor 1633 and the rear illuminance sensor 1635 to thus reduce the display brightness (S395) if the rear light amount is greater than the front light amount (Yes in S373).

Meanwhile, the image processing device 11 may determine whether the front light amount is greater than a first set value (S375) if the rear light amount is less than the front light amount (No in S373), and perform the control to increase the display brightness (S391) if the front light amount measured by the front illuminance sensor 1633 is greater than the first set value (Yes in S375). For example, the first set value may be a value between 1,000 lux and 2,000 lux.

A step of additionally comparing the light amount measured by the front illuminance sensor 1633 with a second set value may be further performed if the front light amount measured by the front illuminance sensor 1633 is not greater than the first set value (No in S375) in the step (S375). For example, the second set value may be a value between 300 lux and 500 lux.

The image processing device 11 may perform the control to reduce the display brightness (S395) if the light amount measured by the front illuminance sensor 1633 is determined to be less than the second set value (Yes in S377) in the step (S377), and perform the control to maintain the display brightness (S395) if the light amount measured by the front illuminance sensor 1633 is determined to be at a level equal to or similar to the second set value (No in S377).

Through this digital rear mirror control method of a vehicle, the LC mirror 17 to which the liquid crystal (LC) method is applied may have a significantly improved response speed compared to a digital rear mirror using an existing electronic chromic (EC) method. Accordingly, the brightness of the mirror may be adjusted immediately based on the fast response speed to the exterior lighting change to thus rapidly inhibit the driver glare, thereby improving the visibility.

Hereinabove, the description mainly describes the preferred embodiments of the present disclosure. All the embodiments and conditional examples disclosed in the specification have been described to intend to assist in the understanding of the principle and concept of the present disclosure by those skilled in the art to which the present disclosure pertains. Therefore, it will be understood by those skilled in the art that the present disclosure may be implemented in modified forms without departing from the spirit and scope of the present disclosure.

Therefore, the embodiments disclosed herein should be considered in an illustrative aspect rather than a restrictive aspect. It should be understood that the scope of the present disclosure is defined by the patent claims, not by the detailed description provided above, and includes any modifications within this scope.

Meanwhile, the methods according to the various embodiments of the present disclosure described above may be implemented as a program and provided to a server or a device. Therefore, each apparatus may access the server or the device that stores the program to download the program.

In addition, the methods according to the various embodiments of the present disclosure described above may be implemented as a program, and stored and provided in various non-transitory computer readable media. The non-transitory computer readable medium is not a medium that stores data therein for a while, such as a register, a cache, or a memory, and indicates a medium that semi-permanently stores data therein and is readable by the device. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, or a read only memory (ROM).

In addition, although the preferred embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

DESCRIPTION OF REFERENCE NUMERALS IN THE DRAWINGS

10: digital room mirror control apparatus
200: digital rear mirror

The invention claimed is:

1. A digital rear mirror control method of a vehicle, the method comprising:

an image input step of receiving a vehicle exterior image from a camera disposed on the vehicle;

an image analysis step of segmenting the input image into a plurality of regions based on a predetermined criterion;

an illuminance measurement step of measuring a light amount from a front illuminance sensor disposed at a front of the vehicle and a light amount from a rear illuminance sensor disposed at a rear of the vehicle;

a determination step of determining whether the input image requires correction, wherein the determination step is performed in response to a condition that the light amount measured by the rear illuminance sensor is greater than the light amount measured by the front illuminance sensor, and wherein the determination is made by comparing a brightness value of at least one of the segmented regions with a predetermined threshold range based on the measured light amounts; and an image processing step of adjusting brightness of the input image if the brightness value of the at least one of the segmented regions is out of the threshold range.

2. The method of claim 1, wherein in the image analysis step, at least one of the pixel value or pixel distribution (histogram) of the input image is used as the criterion to segment a dark region and a bright region within the input image.

3. The method of claim 2, wherein a digital rear mirror includes a mirror film that outputs the vehicle exterior image or optically reflects a rear situation of the vehicle based on an electrical signal.

4. The method of claim 3, further including a step of reducing reflectivity of the mirror film that is performed if the light amount measured by the rear illuminance sensor is less than or equal to the light amount measured by the front illuminance sensor in the illuminance measurement step.

5. The method of claim 2, wherein a digital rear mirror includes a pixel array layer including micro light-emitting diode (LED) elements.

6. The method of claim 5, wherein in the image processing step, the brightness of the segmented region is adjusted if the brightness value of the at least one of the segmented regions is out of the threshold range.

7. The method of claim 2, further comprising:

an image output step of outputting an image whose brightness is adjusted in the image processing step;

an illuminance measurement step of measuring, by an illuminance sensor, the interior and exterior illuminance of the vehicle after the image output step; and a brightness adjustment step of adjusting display brightness of a digital rear mirror by using the measured illuminance as the criterion.

8. The method of claim 7, wherein in the illuminance measurement step, a difference is measured between a light amount measured by a front illuminance sensor disposed at the front of the vehicle and a light amount measured by a rear illuminance sensor disposed at the rear of the vehicle.

9. The method of claim 8, wherein in the brightness adjustment step, the display brightness is reduced if the light amount measured by the rear illuminance sensor is greater than the light amount measured by the front illuminance sensor.

10. The method of claim 9, wherein in the brightness adjustment step, the display brightness is adjusted by comparing the light amount measured by the front illuminance sensor with a predetermined value if the light amount measured by the rear illuminance sensor is less than the light amount measured by the front illuminance sensor in the illuminance measurement step.

11. A non-transitory computer-readable recording medium including a program code for executing the digital rear mirror control method of a vehicle as claimed in claim 1.

12. A digital rear mirror control apparatus of a vehicle, the apparatus comprising:

a digital rear mirror including a mirror film that outputs a vehicle exterior image or optically reflects a rear situation of the vehicle based on an electrical signal that is selectively input thereto;

a camera configured to capture an external environment of the vehicle;

a front illuminance sensor disposed at a front of the vehicle and a rear illuminance sensor disposed at a rear of the vehicle; and an image processing device configured to:

segment the image input from the camera into a plurality of regions based on a predetermined criterion;

measure a light amount from the front illuminance sensor and a light amount from the rear illuminance sensor;

perform a determination of whether the input image requires correction in response to a condition that the light amount measured by the rear illuminance sensor is greater than the light amount measured by the front illuminance sensor, wherein the determination is made by comparing a brightness value of at least one of the segmented regions with a predetermined threshold range based on the measured light amounts; and adjust brightness of the input image if the brightness value of the at least one of the segmented regions is out of the threshold range.

13. The apparatus of claim 12, wherein the image processing device segments a dark region and a bright region within the input image by using at least one of the pixel value or pixel distribution (histogram) of the input image as the criterion.

* * * * *